United States Patent [19]

Hay

[11] 3,752,544

[45] Aug. 14, 1973

[54] SEALED BEARING WITH AXIALLY UNDULATING SEAL LIP

[75] Inventor: Charles N. Hay, Sandusky, Ohio

[73] Assignee: General Motors Corporation, Detroit, Mich.

[22] Filed: May 15, 1972

[21] Appl. No.: 253,047

[52] U.S. Cl. .......................... 308/187.2, 308/187.1
[51] Int. Cl. ........................................... F16c 33/78
[58] Field of Search ..................... 308/187.2, 187.1, 308/187

[56] References Cited
UNITED STATES PATENTS
3,226,168  12/1965  Recknagel ....................... 308/187.1
3,314,735  4/1967  Kocian .............................. 308/187

OTHER PUBLICATIONS
Product Engineering, Feb. 29, 1960, Wayne W. Gordon, Pg. 54–57.

Primary Examiner—Charles J. Myhre
Assistant Examiner—R. H. Lazarus
Attorney—J. L. Carpenter and Peter D. Sachtjen

[57] ABSTRACT

A sealed ball bearing for sealing the annular space between the inner and outer races includes a flexible elastomeric washer that is held in place by a retaining ring mounted in a groove on the outer race. The retaining ring has a plurality of radially inwardly directed spring fingers which urge local segments of the washer axially into contact with the ribbon separator of the bearing thereby causing the washer to assume an axially undulating contact pattern with the inner race. When the bearing is rotated, the separator acts in a camming fashion to axially displace the local segments to establish a traveling wave motion in the washer which prevents contaminant buildup.

2 Claims, 5 Drawing Figures

PATENTED AUG 14 1973

3,752,544

SEALED BEARING WITH AXIALLY UNDULATING SEAL LIP

The present invention relates to sealed bearings and, in particular, to a sealed ball bearing having positive displacement means for preventing the buildup of contaminants at the entrance to the lubricant chamber.

Antifriction bearings, such as ball bearings, oftentimes are provided with shields and seals that prevent the outward flow of the bearing lubricant and effect a barrier against the ingress of contaminants. A commonly employed design takes the form of a metal shield which is snapped into an annular groove of the outer race. The space between the shield and the inner race establishes a labrynth which limits outward flow of lubricants and inward migration of contaminants. A more positive seal can be obtained by molding an elastomeric seal lip at the inner periphery of the shield that effects a sealing contact with the outer surface of the inner race. This arrangement has proven to be highly effective in most sealed bearing environments. However, in many low speed applications such as an agriculture and earth-moving machinery, which are operated in severely contaminated areas, contaminants can build up adjacent the sealing interface and eventually work their way under the seal lip to the interior of the bearing. Such inner contamination can cause scoring and other damage to the bearing members and the raceways.

The present invention provides a sealed bearing having positive means for axially displacing contaminants away from the interface during dynamic operation. Such a bearing uses the camming action of a ball bearing ribbon separator acting against an elastomerical sealing washer to impart a traveling wave motion to the seal lip. More particularly, the separator normally includes circumferentially alternating series of arcuate axially projecting humps and inwardly spaced flats or lands. Herein, a sealing washer and a retaining spring are commonly disposed in a groove in the outer race closely adjacent to the separator. The retaining spring includes axially and radially inwardly projecting spring fingers which serve to bias local segments of the washer against the humps and between the lands. This biasing distorts the washer into a circumferentially axially undulating contact pattern. As the bearing and the separator rotate, each local segment of the washer will alternately rise and fall in accordance with the profile of the separator. Thus, as a section of washer contacts one of the arcuate humps, it will gradually be axially displaced outwardly against the biasing of the spring finger until reaching the crest of the hump and will thereafter be biased inwardly toward the adjacent land. This alternate rise and fall motion of the washer serves to axially displace any contaminants tending to accumulate at the sealing interface.

The above and other features of the present invention will be apparent to one skilled in the art upon reading the following detailed description, reference being made to the accompanying drawings illustrating a preferred embodiment of the present invention in which.

Figure 1:
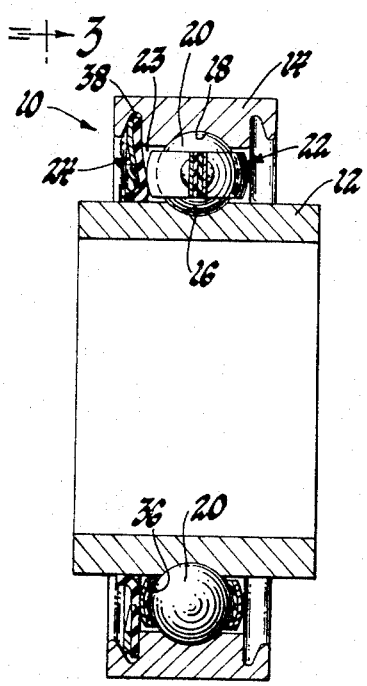
FIG. 1 is a cross sectional view of sealed bearing with an axially undulating seal assembly made in accordance with the present invention.
Figure 2:
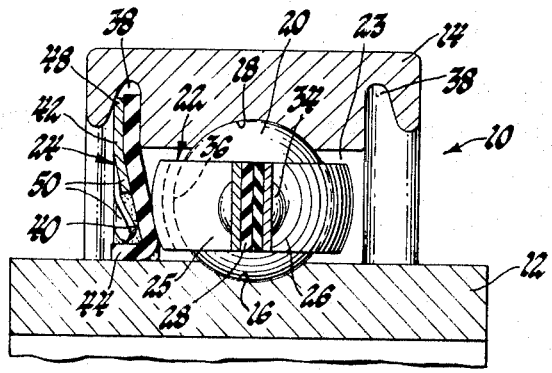
FIG. 2 is an enlarged sectional view of the bearing shown in FIG. 1 illustrating the operative relationship between the bearing separator and the sealing washer.

Referring to the drawings, there is shown an antifriction bearing 10 having an inner race 12 and an outer race 14. The races 12 and 14 are respectively provided with mutually facing annular raceways 16 and 18. The raceways 16, 18 receive a plurality of spherical balls 20 which are circumferentially spaced and guided by a bearing cage or ribbon separator 22 for precision coaxial antifriction rotation between the races 12 and 14. The mutually facing annular surfaces of the races 12 and 14 define an annular chamber 23 which is sealed by a seal assembly 24. The separator 22 comprises a pair of separator rings 25, 26 which are stamped from sheet material and preferably include an inner cushioning layer 28.

Figure 4:
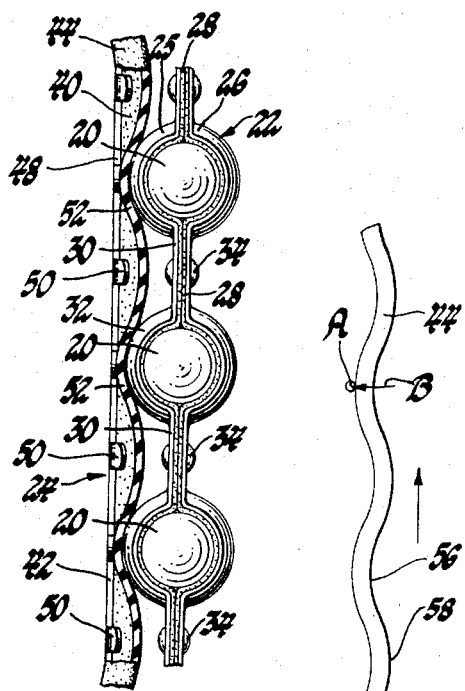
FIG. 4 is a developed view taken along line 4—4 of FIG. 3.

As shown in FIG. 4, the separator rings 25, 26 and ring 25 in particular, include a series of flats or lands 30 which are mutually separated by arcuate humps 32. The separator rings 25, 26 are fastened together at the flats 30 by rivets 34. The mutually facing surfaces of the humps 32 define pockets 36 for the reception of the balls 20. In the illustrated separator, these ball pockets 36 are both circumferentially and radially curved to provide spherical pocket walls for retaining the balls 20 in unit handling relation. With this construction, the separator 22 is supported by the balls 20 out of engagement with the races 12 and 14.

The seal assembly 24 is retained in an annular groove 38 formed in the inner surface of the outer race 14. In this connection, it should be noted that a second seal assembly could be retained in a corresponding groove on the righthand side of the outer race 14. The seal assembly 24 comprises an elastomeric sealing washer 40 and a retaining spring 42. The washer 40 in the free form comprises a flat annulus having an outer diameter substantially the same as the diameter of the groove 38 and an inner diameter having an interference fit with the outer surface of the inner race 12. Thus, in assembly, the interference will cause an axial flattening or deforming at the sealing interface with the inner race 12 to form an axially curved annular seal lip 44.

Figure 3:
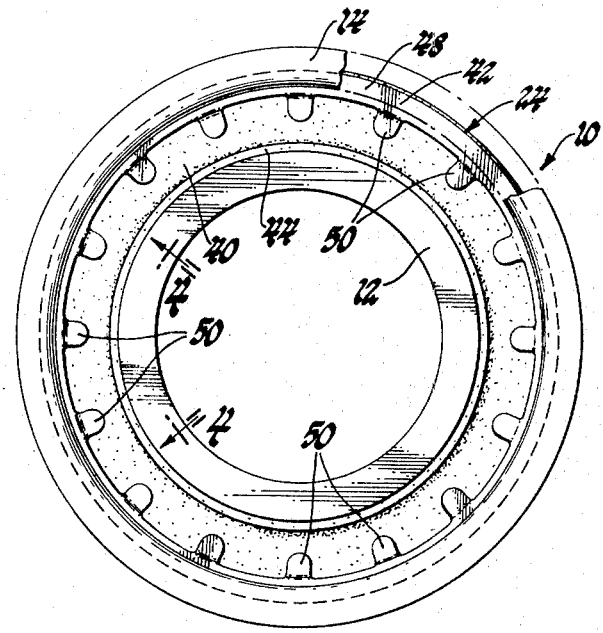
FIG. 3 is a view taken along line 3—3 of FIG. 1 showing details of the retaining ring.
Figure 5:
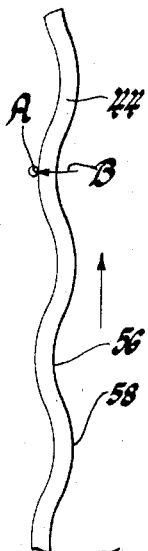
FIG. 5 is a view illustrating the contact pattern between the inner race and the seal lip.

Referring to FIGS. 3 and 4, the retaining spring 42 includes an annular outer body 48 which is received in the groove 38 and a plurality of circumferentially spaced, radially inwardly projecting spring fingers 50. The spring fingers 50 are axially inwardly curved toward the interior of the bearing chamber 23. Thus, the spring fingers 50 will axially bias first local segments 52 of the washer 40 against the facing surface of the humps 32 and second local segments between the humps 32 inwardly toward the lands 30. In the preferred embodiment wherein the number of spring fingers 50 equals the number of lands and humps 32, the biasing provided thereby urges the seal washer 40 into an axially undulating sinusoidal pattern. Thus, as shown in FIG. 5, the seal lip 44 will have a ribbon like contact pattern comprising crests 56 corresponding to the humps 32 and valleys 58 corresponding to the lands 30.

During dynamic operation, the separator 22 rotates at one-half the speed of the outer race 14 and the seal assembly 24. The difference in relative speeds between the seal assembly 24 and the separator 22 causes the separator ring 25 to impart a camming action to the sealing washer 40 which in turn imparts a traveling wave motion to the seal lip 44. Thus, as spring finger 50 advances toward the hump 32, the latter will tend to cam the associated spring finger 50 and adjacent washer section axially outward in accordance with its changing axial profile. This causes an axial displacement of the radially corresponding segment of the seal lip 44. Thus, any particulates or contaminants A, will be displaced axially outwardly as indicated by arrow B. This will keep the interface clear from the contaminants which would otherwise enter the chamber 23. When the spring finger 50 and the crest of the hump 32 are aligned, the maximum rise of the camming action has been reached and upon further relative rotation between the washer 40 and the separator 22, the spring finger 50 will urge the local segment of the washer 40 axially inwardly toward the lands 30 in accordance with the changing profile of the separator ring 25 and consequently change the contact pattern to correspond with the valleys 58.

It will be appreciated, of course, that a change in the relative number of spring fingers with regard to the number of balls and changes in the initial curvature of the spring fingers 50 will cause the seal lip 44 to assume a slightly different contact pattern. However, regardless of these changes, the inherent camming action provided by the separator against the washer will cause a migratory axial oscillation of the seal lip which will prevent the buildup of contaminants thereat. It will also be appreciated that the biasing action provided by the separate retaining ring can be integrally accomplished by suitable change in the cross sectional area and molded shape of the washer.

Although only one form of this invention has been shown and described, other forms will be readily apparent to those skilled in the art. Therefore, it is not intended to limit the scope of this invention by the embodiment selected for the purpose of this disclosure but only by the claims which follow.

What is claimed is:

1. A sealed bearing comprising: a pair of relatively rotatable race means; rolling elements between said race means; a separator for spacing said rolling elements, said separator including a pair of annular members having circumferentially alternating lands and outwardly projecting curved portions, said curved portions defining therebetween pockets for guidingly retaining said rolling elements; a seal member carried by one of said race means having an annular sealing surface engaging the other of said race means; biasing means operatively associated with said seal member for locally urging sections thereof against and between said curved portions such that said sealing surface assumes a circumferentially undulating ocntact pattern with said other of said race means whereby relatively rotating said race means causes said curved portions of the separator to axially displace said sections in a traveling wave motion to displace materials away from said sealing surface.

2. A sealed ball bearing comprising: an inner race and an outer race relatively rotatable about an axis; a plurality of balls engaging said races for providing antifriction rotation between the races; a separator for circumferentially spacing said balls, said separator having a pair of annular rings having mutually facing outwardly projecting arcuate portions defining pockets for guidingly retaining said balls, said arcuate portions being separated by axially recessed flat lands; an elastomeric seal member carried by said outer race having an annular seal lip engaging said inner race; a spring member carried on the outer race, said spring member having a plurality of radially inwardly extending fingers for locally urging portions of said seal member against said arcuate portions whereby said seal lip assumes a circumferentially undulating contact pattern with said inner race whereby rotating said race means causes a camming action of said arcuate portions against the biasing of the spring fingers to axially displace the seal lip in a traveling wave motion and prevent contaminant buildup at the sealing surface.

* * * * *